(12) United States Patent
Brensinger et al.

(10) Patent No.: US 10,982,467 B2
(45) Date of Patent: Apr. 20, 2021

(54) T-LINK HINGE MECHANISM

(71) Applicant: NEMO EQUIPMENT, INC., Dover, NH (US)

(72) Inventors: Camon Brensinger, Stratham, NH (US); Patrick McCluskey, Lee, NH (US); Zackary Kamen, Newburyport, MA (US)

(73) Assignee: Nemo Equipment Inc., Dover, NH (US)

( * ) Notice: Subject to any disclaimer, the term of this patent is extended or adjusted under 35 U.S.C. 154(b) by 0 days.

(21) Appl. No.: 16/725,666

(22) Filed: Dec. 23, 2019

(65) Prior Publication Data

US 2020/0196746 A1 Jun. 25, 2020

Related U.S. Application Data

(60) Division of application No. 16/545,743, filed on Aug. 20, 2019, now Pat. No. 10,716,392, and a
(Continued)

(51) Int. Cl.
*E04H 15/54* (2006.01)
*A47B 3/083* (2006.01)
(Continued)

(52) U.S. Cl.
CPC ............. *E04H 15/54* (2013.01); *A47B 3/002* (2013.01); *A47B 3/06* (2013.01); *A47B 3/083* (2013.01); *A47B 3/0803* (2013.01); *A47B 3/12* (2013.01); *A47B 13/003* (2013.01); *A47B 13/088* (2013.01); *A47B 37/04* (2013.01);

*E04H 15/42* (2013.01); *F16B 12/44* (2013.01); *A47B 2003/0806* (2013.01);
(Continued)

(58) Field of Classification Search
CPC .. A47B 3/12; A47B 3/002; A47B 3/06; A47B 3/0803; A47B 3/083; A47B 13/003; A47B 13/088; A47B 37/04; A47B 2003/0806; A47B 2200/001; A47B 2200/0072; F16B 12/44; F16B 2012/446; Y10T 16/547; E05D 3/06
USPC ............. 16/366; 403/205, 295; 108/77, 115, 108/158.12, 132, 64
See application file for complete search history.

(56) References Cited

U.S. PATENT DOCUMENTS 2,019,374 A * 10/1935 Edward ..................... A47B 3/14
297/141
2,177,202 A * 10/1939 Berge ....................... B60N 2/34
403/73
(Continued)

*Primary Examiner* — William L Miller

(57) ABSTRACT

A T-link hinge for hingeably connecting first and second members comprises a link portion having a T-shaped cross-section including a top region and a bottom region, wherein the top region has a width greater than a width of the bottom region. The link portion comprises first and second thru holes formed in the bottom region of the link portion adjacent each the respective first and second ends of the link portion. Each of the first and second members to which the link portion is to be mounted includes thru holes. In an assembled configuration of the link portion and the first and second members, the thru holes formed on the first and second members axially align with the pair of thru holes in the link portion and are connected by first and second pins.

12 Claims, 5 Drawing Sheets

Related U.S. Application Data continuation of application No. 15/879,007, filed on Jan. 24, 2018, now Pat. No. 10,390,609.

(60) Provisional application No. 62/449,818, filed on Jan. 24, 2017.

(51) Int. Cl.
| | |
|---|---|
| *A47B 13/08* | (2006.01) |
| *A47B 3/08* | (2006.01) |
| *A47B 3/06* | (2006.01) |
| *F16B 12/44* | (2006.01) |
| *A47B 3/12* | (2006.01) |
| *A47B 37/04* | (2006.01) |
| *A47B 13/00* | (2006.01) |
| *E04H 15/42* | (2006.01) |
| *A47B 3/00* | (2006.01) |

(52) U.S. Cl.
CPC . *A47B 2200/001* (2013.01); *A47B 2220/0072* (2013.01); *F16B 2012/446* (2013.01); *Y10T 16/547* (2015.01)

(56) References Cited

U.S. PATENT DOCUMENTS

| | | | | |
|---|---|---|---|---|
| 2,325,182 | A * | 7/1943 | Fitzpatrick | E05D 3/12 108/169 |
| 3,402,422 | A * | 9/1968 | Baer | E05D 3/122 16/366 |
| 7,900,323 | B2 * | 3/2011 | Lin | F21S 6/003 16/254 |
| 2014/0366321 | A1 * | 12/2014 | Chen | E05D 15/26 16/225 |

* cited by examiner

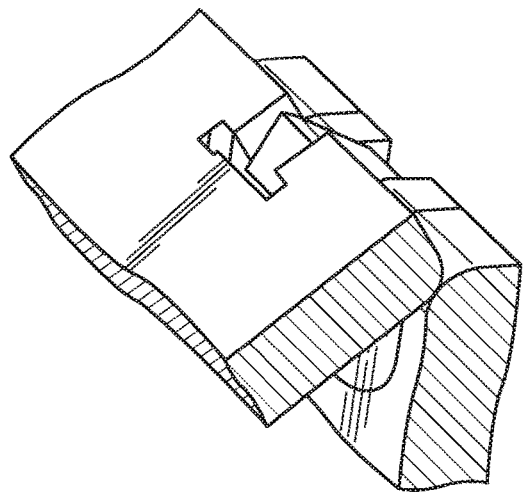
FIG. 4
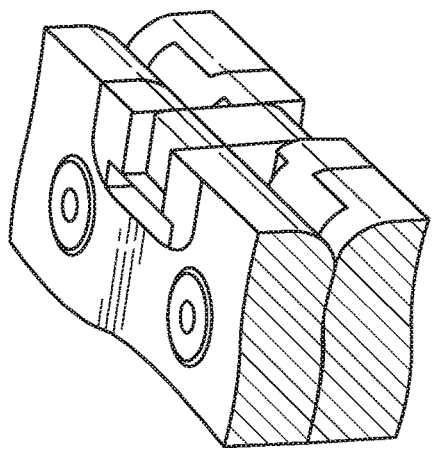
FIG. 6
FIG. 5
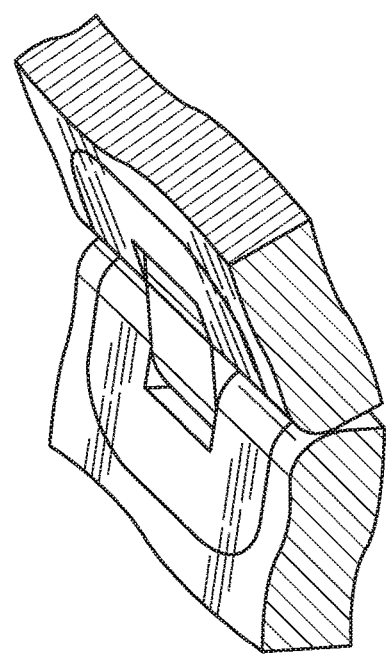
FIG. 7

T-LINK HINGE MECHANISM

CROSS-REFERENCE TO RELATED APPLICATIONS

This application is a Divisional Application of U.S. patent application Ser. No. 16/545,743 filed Aug. 20, 2019 which is a Continuation of U.S. patent application Ser. No. 15/879,007, titled "TABLE TOP AND SKIRT WITH FOLDABLE LEGS" filed on Jan. 24, 2018 (now U.S. Pat. No. 10,390,609 issued on Aug. 27, 2019) and which claims priority from U.S. Provisional Patent Application No. 62/449,818 filed on Jan. 24, 2017 and titled "OUTDOOR EQUIPMENT 2016", all of which are incorporated fully herein by reference.

TECHNICAL FIELD

The present invention relates to hinge mechanisms, and more particularly, relates to foldable hinges useful for foldably connecting together various items and objects.

BACKGROUND INFORMATION

A large portion of the population enjoy camping and other outdoor activities. When engaged in these activities, however, many people enjoy some of the comforts of home. This includes a table or other surface which can be used to prepare food, serve food or place various objects including cook stoves and the like for use during outdoor activities.

Although individuals engaged in the activities enjoy such comforts of home, weight, space and collapsibility is still an important feature. If the table is not able to be folded and stored in a small area and if it is too heavy, its usefulness will be lost to campers and outdoor enthusiasts.

Accordingly, what is needed is a hinge mechanism which allows any device, such as a table, to be folded for purposes of packing it to the outdoor area but which can be unfolded to form a useable item or object.

SUMMARY

The present disclosure features a T-link hinge for hingeably connecting first and second members. The T-link hinge comprises a link portion having a T-shaped cross-section. The link portion comprises a top region and a bottom region, wherein the top region has a width greater than a width of the bottom region. The link portion has first and second ends.

In one embodiment, the link portion comprises first and second thru holes formed in the bottom region of the link portion adjacent each the respective first and second ends of the link portion.

In another embodiment, each of the first and second members include a T-shaped link portion receiving region comprising a top region and a bottom region. The top region has a width greater than a width of the bottom region.

In one embodiment, each of the first and second members including thru holes extending at least partially into the bottom region of each of the T-shaped link portion receiving region of the first and second members.

In an assembled configuration of the link portion and the first and second members, the thru holes formed on the first and second members axially align with the pair of thru holes in the link portion.

The T-link hinge further comprises first and second pins, configured for being disposed in the axially aligned thru holes in the bottom region of each of the T-shaped link portion receiving region of the first and second members and the first and second ends of the link portion.

The present disclosure also features an alternate embodiment of the T-link hinge. The T-link hinge comprises a link portion having a T-shaped cross-section comprising a top portion and a bottom portion. The top portion has a width greater than a width the bottom portion. The link portion has first and second ends, wherein the link portion comprises a pair of thru holes formed on the link portion adjacent each the first and second ends.

In one embodiment, the T-link hinge further comprises first and second panel mount portions. The first panel mount portion configured for being pivotally connected to the first end of the link portion, and the second panel mount portion is configured for being pivotally connected to the second end of the link portion. The first and second panel portions are configured to be fastened to first and second members for hingeably connecting the first and second members.

In another embodiment, the first and second panel mount portions include thru holes. In an assembled configuration of the link portion and the first and second panel mount portions, the thru holes formed on the first and second panel mount portions axially align with the pair of thru holes on the link portion.

The T-link hinge further comprises first and second pins configured for being disposed in the axially aligned thru holes of the first and second panel mount portions and the first and second ends of the link portion.

In another embodiment, the first and second panel mount portions comprise a top flange portion having a pair of mounting holes formed thereon; and a pair of protrusions extending from a bottom surface of the top flange, wherein the thru holes are disposed in the pair of protrusion. The pair of protrusions are flush fitted on the first and second members to be hingeably connected together.

BRIEF DESCRIPTION OF THE DRAWINGS

These and other features and advantages of the present invention will be better understood by reading the following detailed description, taken together with the drawings wherein:

FIGS. 4 through 7 illustrate the operation of a T-link hinge according to one embodiment of the present invention;

DETAILED DESCRIPTION OF THE PREFERRED EMBODIMENTS

Figure 1:
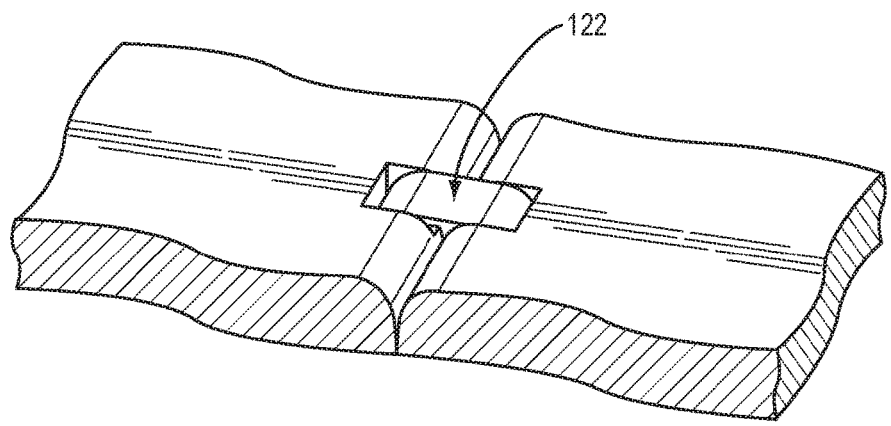
FIGS. 1 through 3 show a T-link hinge useful in a table or other device according to the present invention.

The present invention features a T-link style hinge 122, FIG. 1 that may be utilized for a tabletop or other folding/foldable object. The T-link hinge may be used for other applications as well and is useful in its own right.

Figure 2:
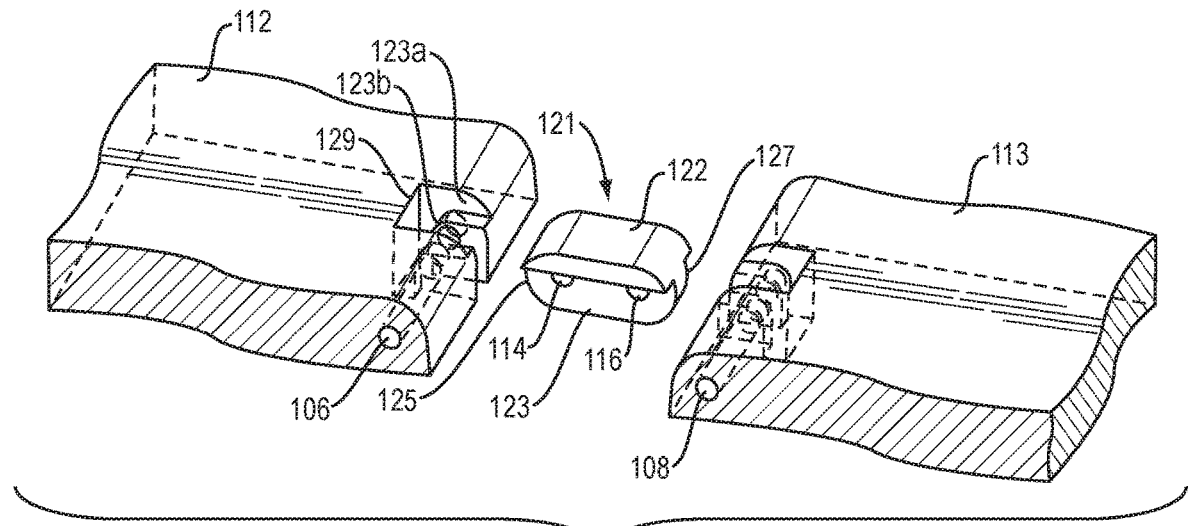
Figure 3:
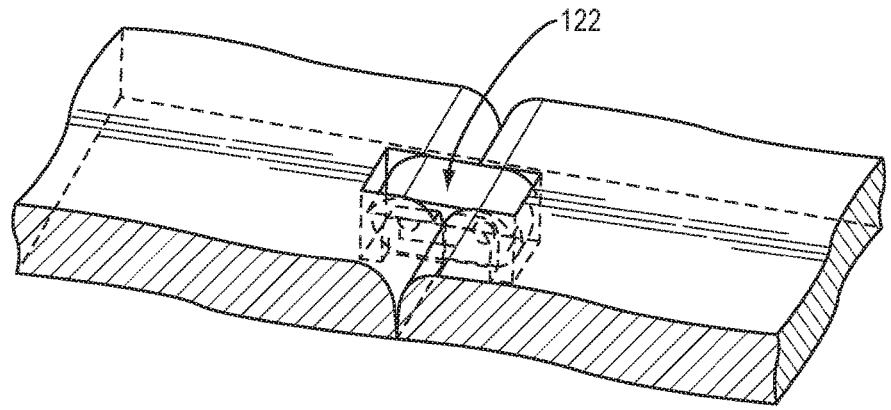

The T-link hinge 122, FIGS. 1 thru 3, according to the first embodiment of the present invention comprises a link portion 122 having a T-shaped cross-section comprising a top region 121 and a bottom region 123. The top region 121 has a width greater than a width of the bottom region 123. The link portion 122 includes first and second ends 125 and 127.

The link portion 122 further comprises first and second thru holes 114 and 116 formed in the bottom region 123 of the link portion 122 adjacent each the respective first and second ends 125, 127 of the link portion 122.

The T-link hinge portion 122 is used to connect a first member 112 and a second member 113. Each of the first and second members 112, 113 include a T-shaped link portion receiving region 129 comprising a top region 129a and a bottom region 129b. The top region 129a has a width greater than a width of the bottom region 129b to accommodate the wider width of the top portion 121 of the link hinge portion 122.

Figure 11B:
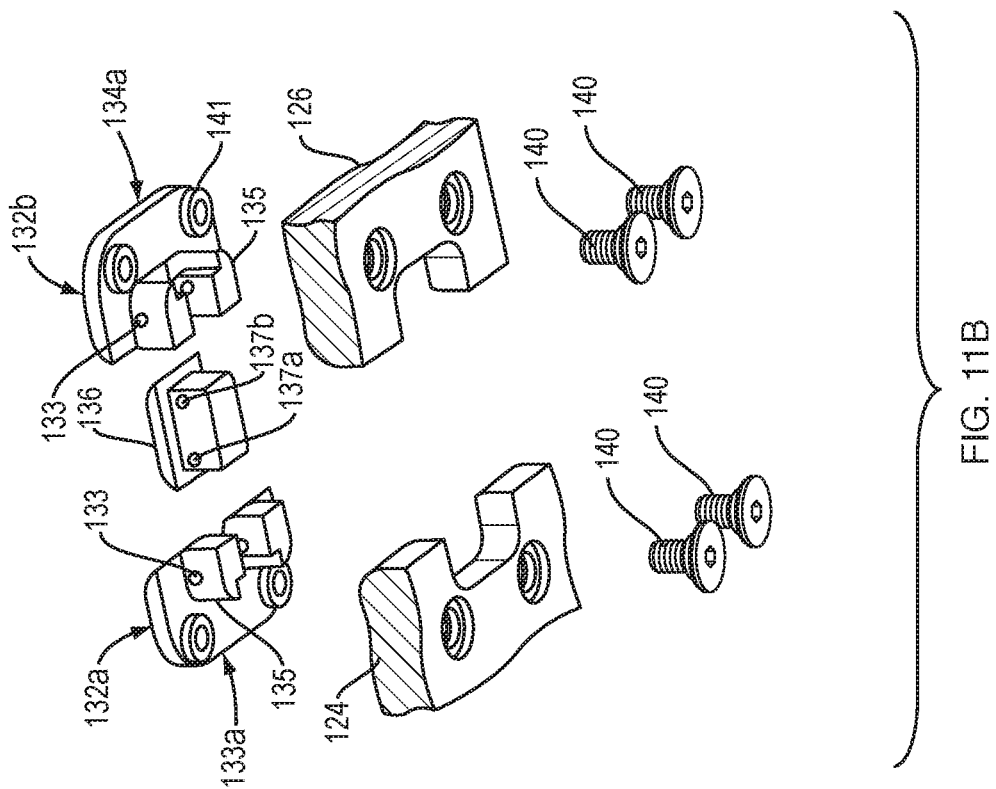
FIGS. 11A and 11B are exploded views of a T link hinge and mounting area according to one feature of the present invention.
Figure 11A:
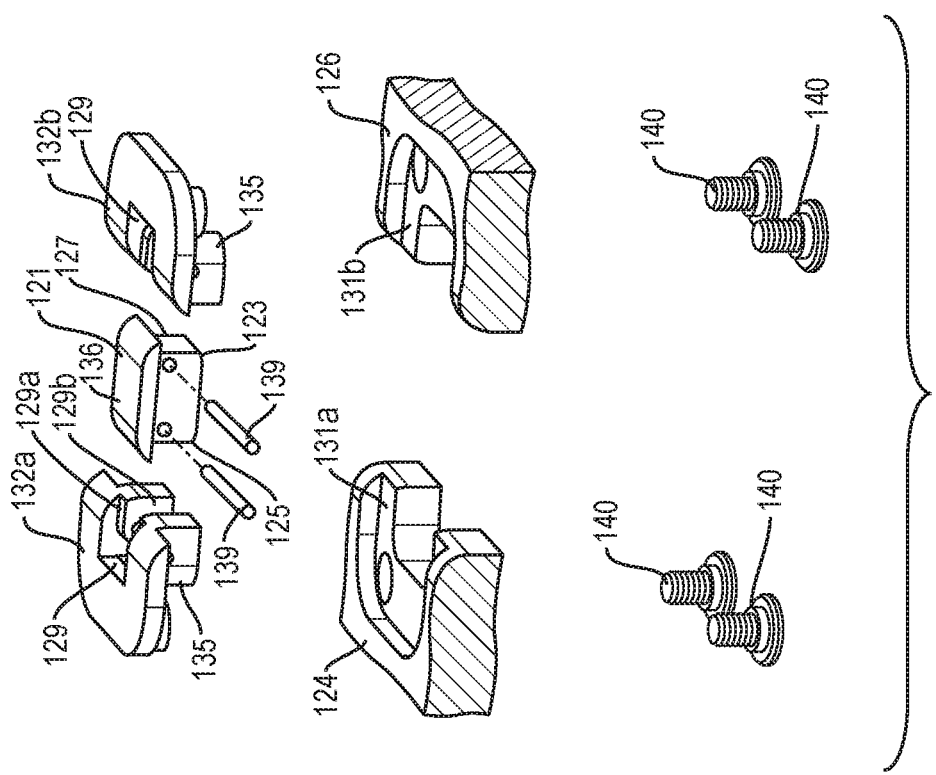
Figure 12A:
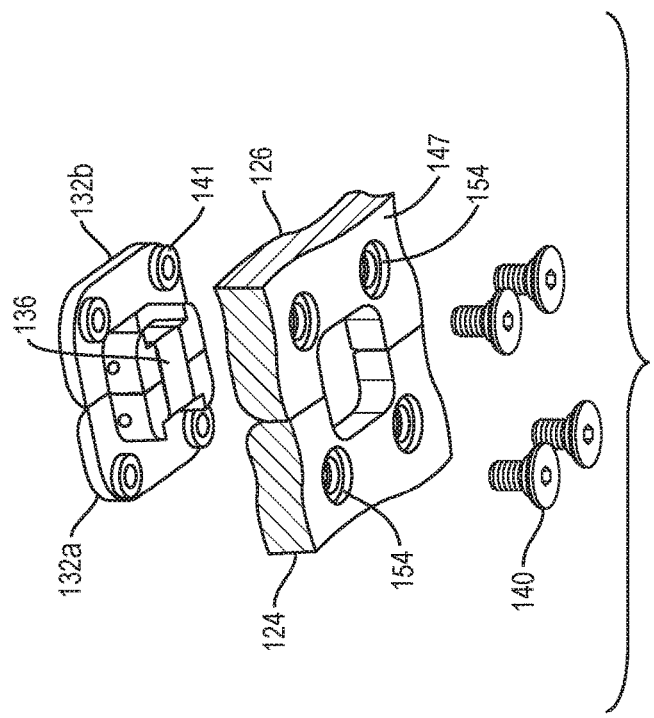
FIGS. 12A thru 12C are exploded views of the T link hinge according to the present invention.
Figure 12B:
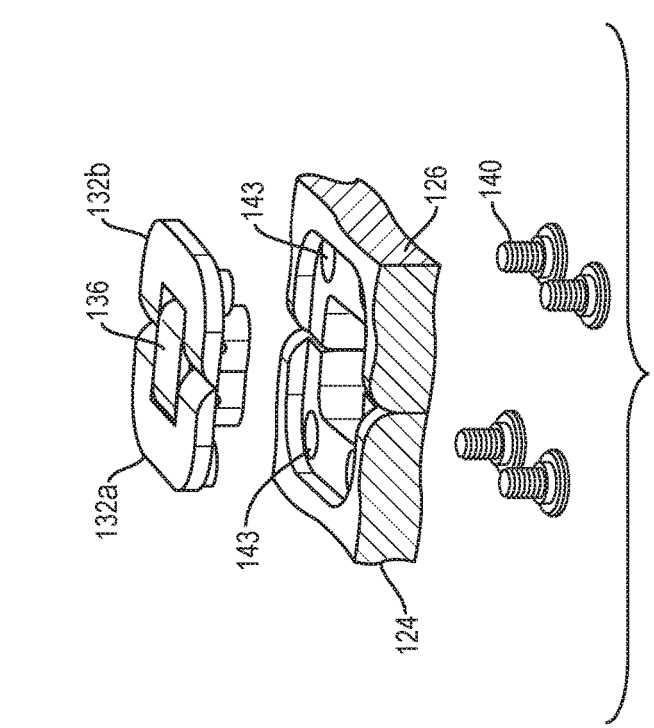
Figure 12C:
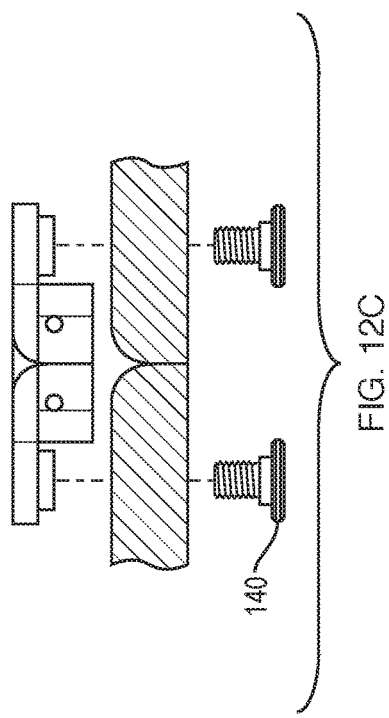

Each of the first and second members 112, 113 include thru holes 106, 108 extending at least partially into the bottom region 123b of each of the T-shaped link portion receiving regions 123 of the first and second members 112, 113, wherein in an assembled configuration of the link portion 122 and the first and second members 112, 113, the thru holes 106, 108 formed in the first and second members 112, 113 axially align with the pair of thru holes 114, 116 in the link portion 122, and are connected via the thru holes 106, 108 utilizing first and second pins (not shown in this drawing but explained in connection with FIG. 11A herein).

Figure 9:
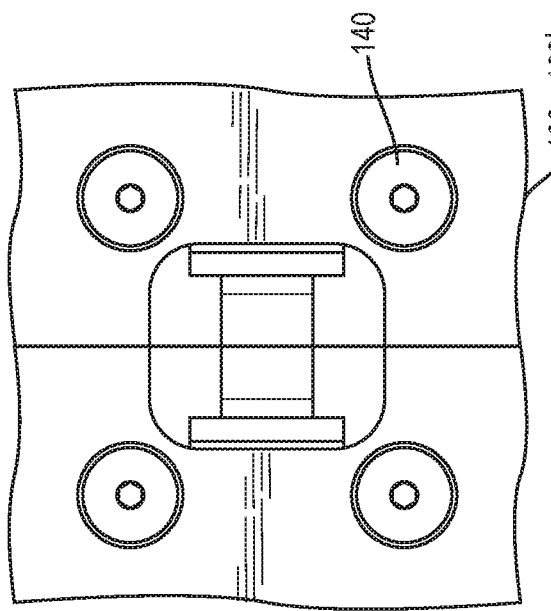
FIGS. 8 through 10 are more detailed close-up and cross-sectional views of the T link hinge according to the invention.
Figure 8:
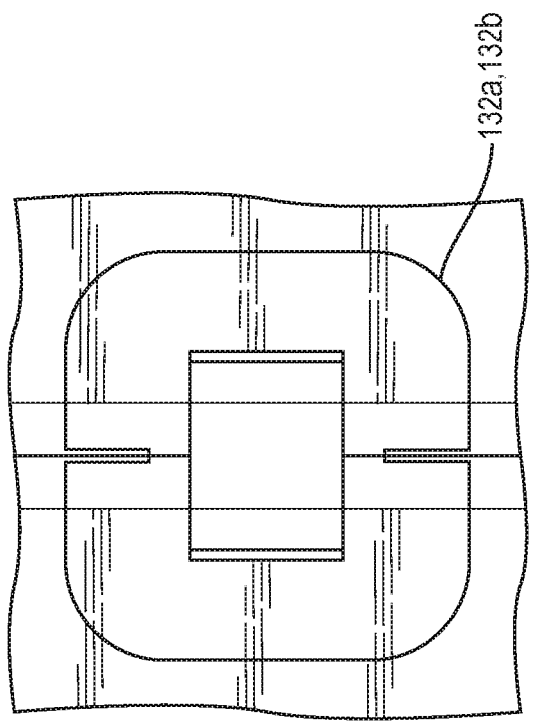
Figure 10:
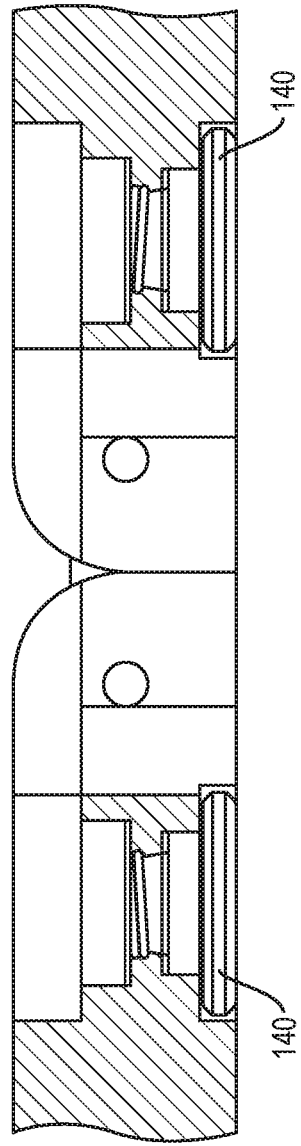

As shown in FIGS. 4 through 12, another exemplary embodiment of T-link hinge 122a provides a flush mounted hinge between two adjoining members 124, 126, which allows the two adjoining members 124, 126 to fold flat directly onto themselves as shown in FIG. 7. This feature and advantage is provided utilizing flush mounted top hinge members 132a and 132b shown in FIGS. 8 and 10 and flush mounted bottom screws 140 as shown in FIGS. 9 and 10.

In this embodiment, the T-link hinge 122a includes first and second hinge top mount portions 132a, 132b, (see FIGS. 11 and 12) coupled together by a link portion 136. The first and second hinge top mount portions 132a, 132b fit into grooves 137 provided in the two adjoining members 124, 126 to be hingeably held together (for example two table top portions). A plurality of recessed screws 140 serve to keep the two adjoining members 124, 126 coupled together by use of the link portion 136, all securely fastened to the two adjoining members 124, 126. This is further illustrated in FIGS. 12A thru 12C.

The T-link hinge 122a in the second embodiment shown in FIGS. 4-12 comprise a link portion 136 having a T-shaped cross-section comprising a top region 121 and a bottom region 123. The top region 121 has a width greater than a width of the bottom region 123. The link portion 136 includes first and second ends 125 and 127.

The link portion 136 further comprises first and second thru holes 137a and 137b formed in the bottom region 123 of the link portion 136 adjacent each the respective first and second ends 125, 127 of the link portion 136.

The T-link hinge portion 136 is used to hingeably connect a first member 124 and a second member 126 utilizing the flush mounted first and second hinge top mount portions 132a, 132b. Each of the first and second members 124, 126 include a T-shaped link portion receiving region 129 comprising a top region 129a and a bottom region 129b. The top region 129a has a width greater than a width of the bottom region 129b to accommodate the wider width of the top portion 121 of the link hinge portion 136.

Each of the first and second hinge top mount portions 132a, 132b include thru holes 133 extending at least partially into the bottom region 135 of each of the T-shaped link portion receiving regions 129 of the first and second hinge top mount portions 132a, 132b. Wherein in an assembled configuration of the link portion 136 and the first and second hinge top mount portions 132a, 132b, the thru holes 133 formed in the bottom region 135 of each of the T-shaped link portion receiving regions 129 axially align with the pair of thru holes 137a, 137b in the link portion 136, and are connected via the thru holes utilizing first and second pins 139.

The first hinge top mount portion 132a is configured for being pivotally connected to a first end 125 of the link portion 136, and the second hinge top mount portion 132b is configured for being pivotally connected to the second end 123 of the link portion 136. The first and second hinge top mount portions 132a, 132b are configured to be fastened to first and second members 124, 126 for hingeably connecting the first and second members 124, 126.

The top flange portions 133a, 133b include a plurality of protrusions 141 on the bottom region of the top flange portions 133a, 133b. Holes 154 in the first and second members 124, 126 allow low-profile screws 140 to pass through the first and second members 124, 126 and thread into the protrusions 141 on the bottom region of the first and second top flange portions 133a, 133b. The low profile screws mount flush with a bottom region or surface 147 of the first and second members 124, 126.

The first and second members 124, 126 comprise a top flange portion mounting/receiving region recess 131a, 131b and a plurality of thru holes 143 having a diameter large enough to accommodate and receive the protrusions 141 on the bottom region of the top flange portions 133a, 133b. Top flange portions 133a, 133b are flush mounted in the recess 129 provided in each of the first and second members 124, 126 to be hingeably connected.

Accordingly, the T-link hinge according to one feature of the invention may be utilized along with a foldable table or with any other product that requires a foldable hinge having a flush top and bottom surface.

Modifications and substitutions by one of ordinary skill in the art are considered to be within the scope of the present invention, which is not to be limited except by the allowed claims and their legal equivalents.

The invention claimed is:

1. A T-link hinge for hingeably connecting first and second members, said T-link hinge comprising:
   a link portion having a T-shaped cross-section comprising a top region and a bottom region, said top region having a width greater than a width of said bottom region, said link portion having first and second ends;
   wherein said link portion comprises first and second thru holes formed in said bottom region of said link portion adjacent each said respective first and second ends of said link portion;
   wherein each of said first and second members include a T-shaped link portion receiving region comprising a top region and a bottom region, said top region having a width greater than a width of said bottom region, each of said first and second members including thru holes extending at least partially into said bottom region of each of said T-shaped link portion receiving region of said first and second members, wherein in an assembled configuration of said link portion and said first and second members, said thru holes formed on said first and second members axially align with said pair of thru holes in said link portion; and
   first and second pins, configured for being disposed in said axially aligned thru holes in said bottom region of each of said T-shaped link portion receiving region of said first and second members and said first and second ends of said link portion.

2. A T-link hinge comprising:
a link portion having a T-shaped cross-section comprising a top portion and a bottom portion, said top portion having a width greater than a width said bottom portion, said link portion having first and second ends and wherein said link portion comprises a pair of thru holes formed on said link portion adjacent each said first and second ends of said link portion;
first and second panel mount portions, said first panel mount portion configured for being pivotally connected to said first end of said link portion, and said second panel mount portion configured for being pivotally connected to said second end of said link portion, wherein said first and second panel mount portions are configured to be fastened to first and second members for hingeably connecting said first and second members.

3. The T-link hinge according to claim 2, wherein said first and second panel mount portions include thru holes, wherein in an assembled configuration of said link portion and said first and second panel mount portions, said thru holes formed on said first and second panel mount portions axially align with said pair of thru holes on said link portion.

4. The T-link hinge according to claim 3, further comprising first and second pins configured for being disposed in said axially aligned thru holes of said first and second panel mount portions and said first and second ends of said link portion.

5. The T-link hinge as claimed in claim 4, wherein said first and second panel mount portions comprise:
a top flange portion having a pair of mounting holes formed thereon; and
a pair of protrusions extending from a bottom surface of said top flange, wherein said thru holes are disposed in said pair of protrusions.

6. The T-link hinge according to claim 5, wherein said pair of protrusions are flush fitted on the first and second members to be hingeably connected.

7. A T-link hinge comprising:
a link portion having a T-shaped cross-section comprising a top portion and a bottom portion, said top portion having a width greater than a width said bottom portion, said link portion having first and second ends;
first and second panel mount portions, said first panel mount portion configured for being pivotally connected to said first end of said link portion means of a pin connection, and said second panel mount portion configured for being pivotally connected to said second end of said link portion via another pin joint, said first and second panel mount portions being independently pivotally movable with respect to said link portion, wherein said first and second panel portions are configured to be fastened to first and second members for hingeably connecting said first and second members.

8. The T-link hinge according to claim 7, wherein said pin connection comprises a pair of thru holes formed on said link portion adjacent each said first and second ends of said link portion.

9. The T-link hinge according to claim 8, wherein said pin connection includes thru holes in said first and second panel mount portions, and wherein said pin connection includes first and second pins; and wherein in an assembled configuration of said link portion and said first and second panel mount portions, said thru holes formed on said first and second panel mount portions axially align with said pair of thru holes on said link portion for receiving said first and second pins therewithin.

10. The T-link hinge as claimed in claim 9, wherein said first and second panel mount portions comprise:
a top flange portion; and
a pair of protrusions extending from a bottom surface of said top flange, wherein said thru holes are disposed in said pair of protrusions.

11. The T-link hinge according to claim 10, wherein said pair of protrusions are flush fitted on the first and second members to be hingeably connected.

12. A T-link hinge comprising:
a link portion having a T-shaped cross-section comprising a top portion and a bottom portion, said top portion having a width greater than a width said bottom portion, said link portion having first and second ends, wherein said link portion comprises a pair of thru holes formed on said link portion adjacent each said first and second ends;
first and second panel mount portions, said first panel mount portion configured for being pivotally connected to said first end of said link portion, and said second panel mount portion configured for being pivotally connected to said second end of said link portion, wherein said first and second panel portions are configured to be fastened to first and second members, for hingeably connecting said first and second members, wherein said first and second panel mount portions include thru holes, wherein in an assembled configuration of said link portion and said first and second panel mount portions, said thru holes formed on said first and second panel mount portions axially align with said pair of thru holes on said link portion, wherein said first and second panel mount portions comprise:
a top flange portion having a pair of mounting holes formed thereon; and
a pair of protrusions extending from a bottom surface of said top flange, wherein said thru holes are disposed in said pair of protrusion, said pair of protrusions are flush fitted on the first and second members to be hingeably connected; and
first and second pins configured for being disposed in said axially aligned thru holes of said first and second panel mount portions and said first and second ends of said link portion.

* * * * *